US011473895B2

United States Patent
Liu et al.

(10) Patent No.: US 11,473,895 B2
(45) Date of Patent: Oct. 18, 2022

(54) REFLECTIVE CONDENSING INTERFEROMETER

(71) Applicant: National Applied Research Laboratories, Taipei (TW)

(72) Inventors: Yi-Cheng Liu, Taipei (TW); Chun-Jen Weng, Taipei (TW); Tai-Shan Liao, Taipei (TW); Guo-Hao Lu, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 120 days.

(21) Appl. No.: 16/920,287

(22) Filed: Jul. 2, 2020

(65) Prior Publication Data
US 2021/0172722 A1    Jun. 10, 2021

(30) Foreign Application Priority Data
Dec. 10, 2019    (TW) .................... 108145050

(51) Int. Cl.
*G01B 9/02056*    (2022.01)
*G02B 27/10*    (2006.01)
(Continued)

(52) U.S. Cl.
CPC ..... *G01B 9/02059* (2013.01); *G01B 9/02057* (2013.01); *G02B 1/11* (2013.01);
(Continued)

(58) Field of Classification Search
CPC ............ G01B 9/02056; G01B 9/02057; G01B 9/02059; G01B 11/0675; G01B 11/2441; G02B 17/061
See application file for complete search history.

(56) References Cited

U.S. PATENT DOCUMENTS

| 6,522,717 B1 * | 2/2003 | Murakami | G21K 7/00 378/34 |
| 2021/0164894 A1 * | 6/2021 | Prater | G01N 21/35 |

FOREIGN PATENT DOCUMENTS

DE    102011000213 A1 *    7/2012    ........... G02B 21/002

OTHER PUBLICATIONS

Emer, Wolfgang et al. "Ultraviolet interferometry with apochromatic reflection optics". Applied Optics, vol. 38, No. 16, Jun. 1, 1999, pp. 3516-3522. (Year: 1999).*

(Continued)

*Primary Examiner* — Michael A Lyons
(74) *Attorney, Agent, or Firm* — Cheng-Ju Chiang

(57) ABSTRACT

The present invention provides a reflective condensing interferometer for focusing on a preset focus. The reflective condensing interferometer includes a concave mirror set, a convex mirror, a light splitting element, and a reflecting element. The concave mirror set has first and second concave surface portions which are oppositely located on two sides of a central axis passing through the preset focus and are concave on a surface facing the central axis and the preset focus. Light is preset to be incident in parallel to the central axis in use. The convex mirror is disposed between the concave mirror set and the preset focus on the central axis, and is convex away from the preset focus. The light splitting element vertically intersects with the central axis between the convex mirror and the preset focus. The reflecting element is disposed between the light splitting element and the convex mirror.

13 Claims, 12 Drawing Sheets

(51) Int. Cl.
*G02B 1/11* (2015.01)
*G02B 5/08* (2006.01)
*G02B 17/06* (2006.01)

(52) U.S. Cl.
CPC ............. *G02B 5/08* (2013.01); *G02B 17/061* (2013.01); *G02B 27/1006* (2013.01); *G01B 2290/60* (2013.01)

(56) References Cited

OTHER PUBLICATIONS

Lan, Gongpu et al. "Theory and design of Schwarzschild scan objective for Optical Coherence Tomography". Optics Express, vol. 27, No. 4, Feb. 18, 2019, pp. 5048-5064. (Year: 2019).*

* cited by examiner

REFLECTIVE CONDENSING INTERFEROMETER

BACKGROUND

Technical Field

The present invention relates to a reflective condensing interferometer. Specifically, the present invention relates to a reflective condensing interferometer having a concave mirror set, a convex mirror, and a light splitting element.

Related Art

During various optical processing or optical analysis, various optical phenomena may be used or artificially generated to achieve a desired process effect or information obtaining effect. For example, optical phenomena such as focusing and interference may be applied or artificially generated to achieve the desired process effect or information obtaining effect. However, during focusing with a lens, due to a refractive index difference, dispersion of light of different colors often occurs, such that accurate focusing cannot be achieved. In addition, optical phenomena such as focusing and interference cannot be both achieved with a simple structure.

SUMMARY

Technical means for resolving the problem

In order to resolve the above problem, an embodiment of the present invention provides a reflective condensing interferometer for focusing on a preset focus. The reflective condensing interferometer includes: a concave mirror set having at least a first concave surface portion and at least a second concave surface portion which are oppositely located on two sides of a central axis and are concave on a surface facing the central axis and the preset focus, where the central axis passes through the preset focus, and light is preset to be incident into the reflective condensing interferometer in parallel to the central axis during use of the reflective condensing interferometer; a convex mirror disposed between the concave mirror set and the preset focus on the central axis and convex away from the preset focus; a light splitting element vertically intersecting with the central axis between the convex mirror and the preset focus; and a reflecting element disposed between the light splitting element and the convex mirror.

Another embodiment of the present invention provides a reflective condensing interferometer for focusing on a preset focus. The reflective condensing interferometer includes: a concave mirror set having at least a first concave surface portion and at least a second concave surface portion which are oppositely located on two sides of a central axis and are concave on a surface facing the central axis; a convex mirror disposed on the central axis and convex toward the concave mirror set; a light splitting element vertically intersecting with the central axis on a side of the convex mirror facing away from the concave mirror set; and a reflecting element disposed between the light splitting element and the convex mirror. When incident light is incident toward the convex mirror from a side of the convex mirror facing away from the light splitting element in parallel to the central axis, the incident light is sequentially reflected by the convex mirror and the first concave surface portion or the second concave surface portion toward the preset focus, and when passing through the light splitting element, the incident light is split by the light splitting element into detection light to be transmitted toward the preset focus and reference light to be reflected toward the reflecting element. If the detection light and the reference light are split at a first position on the light splitting element, the detection light to be subsequently emitted toward and reflected at the preset focus, and the reference light to be subsequently emitted toward and reflected at the reflecting element converge, at a second position on the light splitting element symmetrical to the first position based on the central axis, into emergent light to be emitted away from the preset focus, and are then sequentially reflected by the second concave surface portion or the first concave surface portion and the convex mirror.

Still another embodiment of the present invention provides a reflective condensing interferometer for focusing on a preset focus. The reflective condensing interferometer includes: a concave mirror set having at least a first concave surface portion and at least a second concave surface portion which are oppositely located on two sides of a central axis and are concave on a surface facing the central axis and the preset focus, where the central axis passes through the preset focus, and light is preset to be incident into the reflective condensing interferometer in parallel to the central axis during use of the reflective condensing interferometer; a convex mirror disposed between the concave mirror set and the preset focus on the central axis and convex away from the preset focus; and a light splitting element vertically intersecting with the central axis on a side of convex mirror facing away from the preset focus.

Technical effects compared to the prior art.

The reflective condensing interferometer provided in the embodiments of the present invention can perform focusing and generate interference signals, and reduce or avoid dispersion. Therefore, the reflective condensing interferometer provided in the embodiments of the present invention may be applied to any optical processing or optical analysis that requires both focusing and interference signal generation, or may be combined with any related apparatus to achieve further optical processing or analysis capability.

DETAILED DESCRIPTION

Various embodiments are described below, and a person of ordinary skill in the art may easily understand the spirit and principles of the present invention with reference to descriptions and the accompanying drawings. Although some specific embodiments are described in detail in this specification, such embodiments are merely exemplary and are not intended to be limitative or exhaustive in every respect. Therefore, various changes and modifications may be apparent and easily made to the present invention by a person of ordinary skill in the art without departing from the spirit and principles of the present invention.

Figure 1:
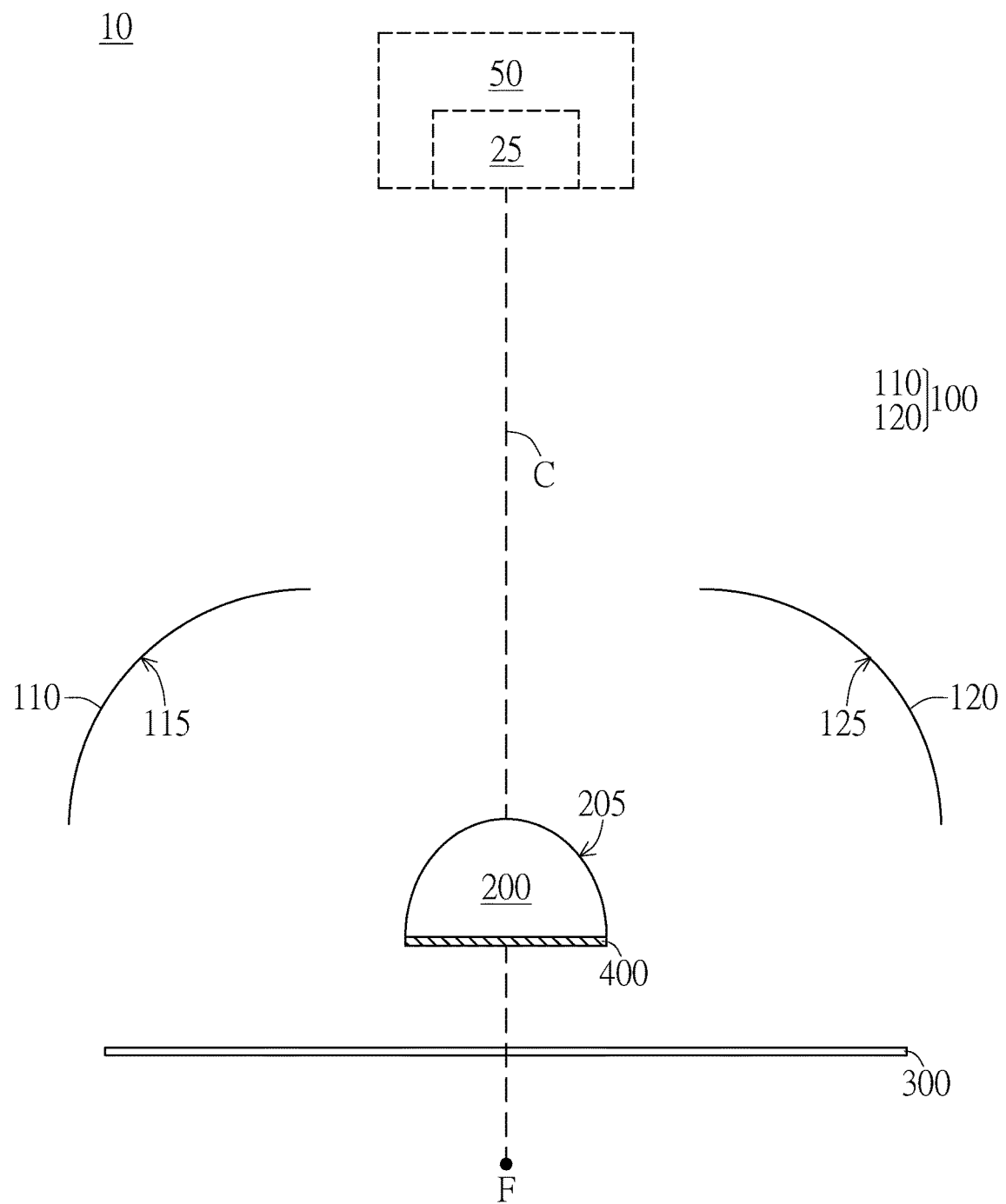
FIG. 1 is a schematic diagram of a reflective condensing interferometer according to an embodiment of the present invention.

Referring to FIG. 1, according to an embodiment of the present invention, a reflective condensing interferometer 10 may have an optical architecture including a concave mirror set 100, a convex mirror 200, a light splitting element 300, and a reflecting element 400. Accordingly, based on this optical architecture, the reflective condensing interferometer 10 may be configured to focus incident light on a preset focus F, so as to achieve a focusing function of the reflective condensing interferometer 10. In addition, in order to generate incident light, in this embodiment, the reflective condensing interferometer 10 may further include a light source 25. For example, the reflective condensing interferometer 10 may include a light processing module 50. The light processing module 50 includes at least a light source 25 configured to generate incident light to the optical architecture including the concave mirror set 100, the convex mirror 200, the light splitting element 300, and the reflecting element 400. However, the above is merely an example. According to some embodiments of the present invention, the reflective condensing interferometer 10 may not include the light source 25, and the reflective condensing interferometer 10 may be additionally combined with other apparatuses having the light source 25 or means for generating incident light, so as to implement the function of focusing light on the preset focus F. In addition, the light processing module 50 may include only the light source 25, or may further include other components or apparatuses, such as an optical analysis instrument, etc., and the present invention is not limited thereto.

According to this embodiment, the light source 25 or other light-emitting means or instruments may emit light so that the light is preset to be incident into the reflective condensing interferometer 10 in parallel to a central axis C. The central axis C passes through the preset focus F. In this way, the light incident parallel to the central axis C can be correctly guided by the reflective condensing interferometer 10, thereby achieving the function of focusing on the preset focus F on the central axis C. Further, light emitted from the light source 25 may not be parallel to the central axis C at the beginning, but parallel to the central axis C only after being guided to pass through other paths or even other components such as an optical element and before being incident into the optical architecture including the concave mirror set 100, the convex mirror 200, the light splitting element 300, and the reflecting element 400. In addition, according to some embodiments of the present invention, the light may not be incident in parallel to the central axis C, but incident approximately along the central axis C with a slight deviation. Those of ordinary skill in the art to which the present invention belongs should be able to understand the principle of light incidence and possible changes and deviations after reviewing the entire description.

Next, the reflective condensing interferometer 10 according to this embodiment is described in detail still with reference to FIG. 1. In detail, the concave mirror set 100 may have at least a first concave surface portion 110 and at least a second concave surface portion 120 which are oppositely located on two sides of the central axis C and are concave on a surface facing the central axis C and the preset focus F. For example, the first concave surface portion 110 may have a first concave surface 115 facing the central axis C and the preset focus F, and the second concave surface portion 120 may have a second concave surface 125 facing the central axis C and the preset focus F. According to some embodiments, the above concave mirror set 100 may be an integrally formed ring-shaped concave mirror, so that the concave mirror set 100 taken in the cross-sectional schematic diagram shown in FIG. 1 is divided into the first concave surface portion 110 and the second concave surface portion 120 oppositely located on the two sides of the central axis C. In this case, the first concave surface 115 and the second concave surface 125 may be substantially the same surface. However, according to other embodiments, the concave mirror set 100 may include paired first concave surface portion 110 and a second concave surface portion 120 separated from each other, and the first concave surface portion 110 and the second concave surface portion 120 are oppositely located on the two sides of the central axis C. In this case, the first concave surface 115 and the second concave surface 125 may be substantially separate surfaces. In addition, when the concave mirror set 100 may include the paired first concave surface portion 110 and a second concave surface portion 120 separated from each other, one or more pairs of first concave surface portions 110 and second concave surface portions 120 may be disposed.

According to some embodiments, the first concave surface portion 110 and the second concave surface portion 120 may be symmetrically disposed on the two sides of the central axis C relative to the central axis C. However, if optical path guidance described in detail below can be achieved, the first concave surface portion 110 and the second concave surface portion 120 may also be asymmetrically disposed relative to the central axis C in other embodiments, and the present invention is not limited thereto.

Still referring to FIG. 1, a convex mirror 200 may be disposed between the concave mirror set 100 and the preset focus F on the central axis C. The convex mirror 200 may be convex away from the preset focus F. For example, the convex mirror 200 may have a convex surface 205 that is convex toward the concave mirror set 100 along the central axis C away from the preset focus F.

According to some embodiments, the convex mirror 200 may be symmetrically disposed on the central axis C relative to the central axis C. However, if optical path guidance described in detail below can be achieved, the convex mirror 200 may also be asymmetrically disposed relative to the central axis C in other embodiments, and the present invention is not limited thereto.

In addition, a light splitting element 300 may vertically intersect with the central axis C between the convex mirror 200 and the preset focus F. In other words, the light splitting element 300 may vertically intersect with the central axis C on a side of the convex mirror 200 facing away from the concave mirror set 100. The light splitting element 300 may be an optical component that reflects a part of light and transmits a part of the light, or splits the light passed through in any manner, so as to emit the light in different directions, and may split light by using any technology or component. For example, a conventional light splitting element may be used. In some embodiments, light splitting may also be implemented by using optical principles such as double slit, and the present invention is not limited thereto.

According to this embodiment, the reflective condensing interferometer 10 further has a reflecting element 400 disposed between the light splitting element 300 and the convex mirror 200. For example, the reflecting element 400 may be directly connected to the side of the convex mirror 200 facing away from the concave mirror set 100, or the reflecting element 400 may be separated from the side of the convex mirror 200 facing away from the concave mirror set 100 and disposed between the light splitting element 300 and the convex mirror 200. Accordingly, the aspect shown in FIG. 1 is merely an example, and the present invention is not limited thereto.

Further, according to some embodiments, in order to adjust a required optical path, a distance of the light splitting element 300 relative to the convex mirror 200 is adjustable.

In some embodiments, the reflecting element 400 may be a metal mirror. However, the material and the structure of the reflecting element 400 of the present invention are not limited thereto provided that a reflecting effect can be achieved.

Performing focusing and interference by the reflective condensing interferometer 10 according to this embodiment is further described below with reference to FIG. 2A to FIG. 3.

Figure 2A:
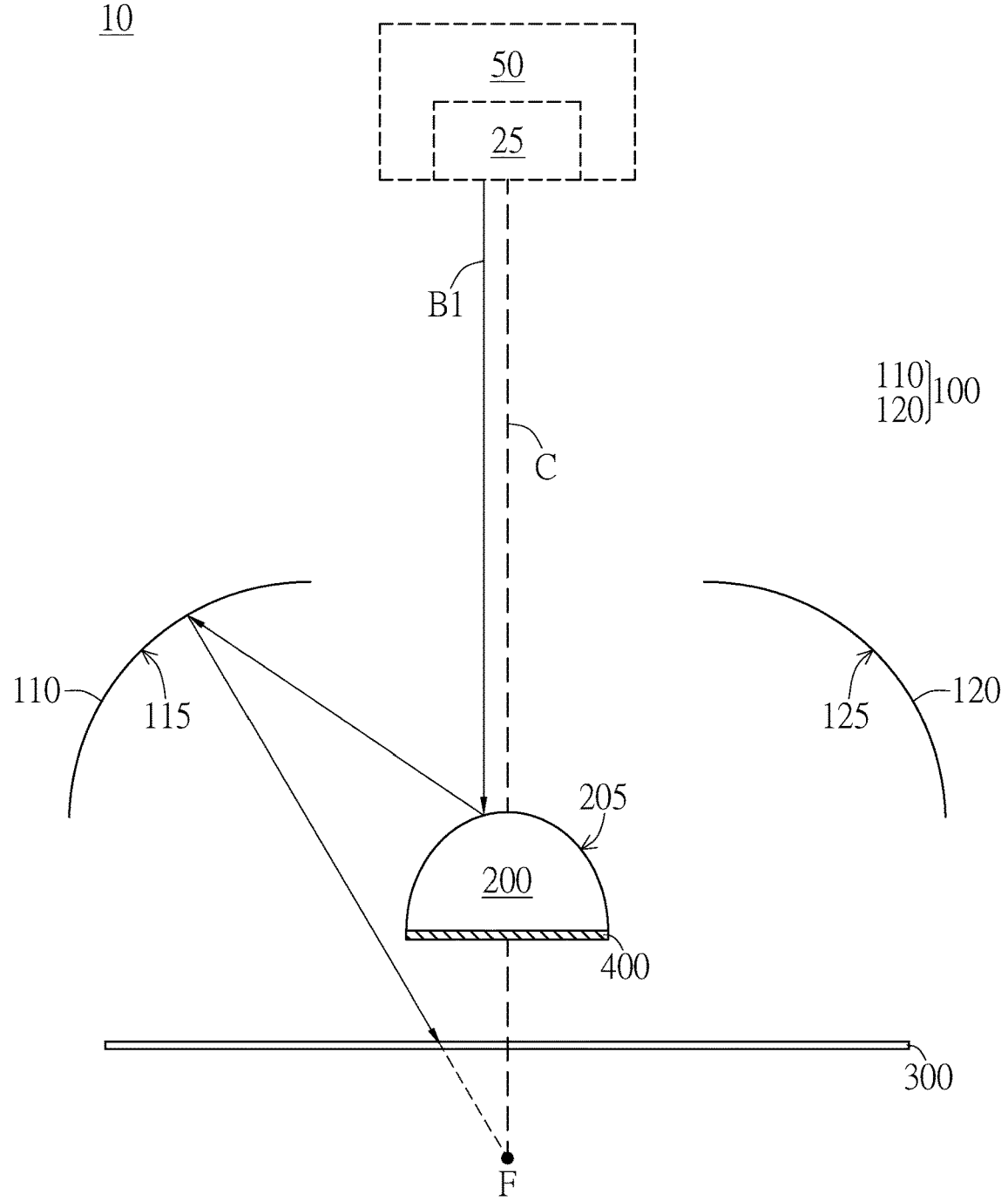
FIG. 2A to FIG. 3 are schematic diagrams of performing focusing and/or interference by a reflective condensing interferometer according to an embodiment of the present invention.

Specifically, referring to FIG. 2A, incident light B1 may be incident in parallel to the central axis C toward the convex mirror 200 from a side of the convex mirror 200 facing away from the light splitting element 300. For example, the incident light B1 may be emitted from the light source 25 toward the convex surface 205 of the convex mirror 200. Accordingly, the incident light B1 may be reflected by the convex mirror 200 toward the first concave surface portion 110 or the second concave surface portion 120 and then reflected. For example, in this embodiment, the incident light B1 is sequentially reflected by the convex mirror 200 and the first concave surface portion 110. In this way, the incident light B1 can be guided toward the preset focus F.

Figure 2B:
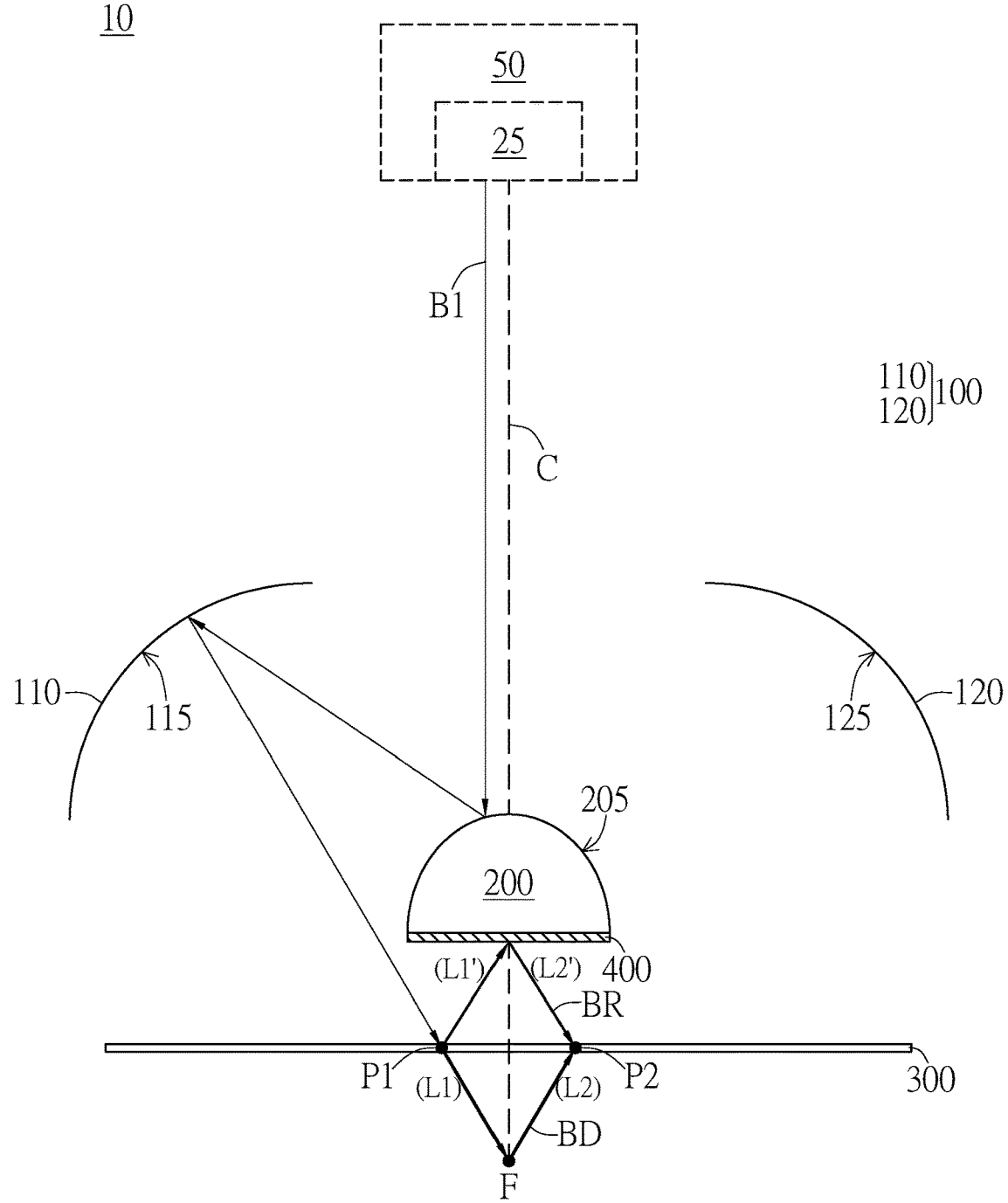

Next, referring to FIG. 2B, the incident light B1 toward the preset focus F is first emitted toward the light splitting element 300 between the convex mirror 200 and the preset focus F. Accordingly, when passing through the light splitting element 300, the incident light B1 can be split by the light splitting element 300 into detection light BD to be transmitted toward the preset focus F and reference light BR to be reflected toward the reflecting element 400. In particular, the incident light B1 can be split at a first position P1 on the light splitting element 300. Accordingly, after the light is split, the detection light BD continues advancing to arrive at the preset focus F, so as implement the focusing function of the reflective condensing interferometer 10. In application, an object that needs to be operated through light focusing or an object that needs to be detected through light focusing may be disposed on the preset focus F. Specifically, according to the present invention, the reflective condensing interferometer 10 may be applied to operate or detect a specific object (such as a to-be-detected sample) placed on a preset focus F. As described above, if a specific object (such as the to-be-detected sample) is disposed on the preset focus F, the detection light BD may be further reflected by the specific object (such as the to-be-detected sample).

Meanwhile, after splitting, the reference light BR is emitted toward the reflecting element 400 and reflected by the reflecting element 400. Therefore, the detection light BD reflected at the preset focus F and the reference light BR emitted toward and reflected by the reflecting element 400 can return to the light splitting element 300 again. Accordingly, a configuration can be designed, for example, the components in the optical architecture may be symmetrically designed so that points at which the detection light BD and the reference light BR are emitted back to the light splitting element 300 can intersect. For example, if the detection light BD and the reference light BR are split at the first position P1 on the light splitting element 300, the detection light BD to be subsequently emitted toward and reflected at the preset focus F, and the reference light BR to be subsequently emitted toward and reflected at the reflecting element 400 may converge at a second position P2 on the light splitting element 300 symmetrical to the first position P1 based on the central axis C. In other words, according to this embodiment, the incident light B1 may be split into the detection light BD and the reference light BR, which may converge again after reflected by a specific object and the reflecting element 400 respectively. In this case, referring to both FIG. 2B and FIG. 2C, the detection light BD reflected from the preset focus F and transmitted through the light splitting element 300 and the reference light BR reflected from the reflecting element 400 and then reflected by the light splitting element 300 may converge into emergent light B2 to be emitted away from the preset focus F.

Optical interference may be generated during convergence of the detection light BD and the reference light BR. For example, a detection light path of the split detection light BD before convergence may be a sum of a distance L1 and a distance L2 shown in FIG. 2B and FIG. 2C, and a reference light path of the split reference light BR before convergence may be a sum of a distance L1' and a distance L2' shown in FIG. 2B and FIG. 2C. Accordingly, based on an optical path difference between the detection light path and the reference light path, during convergence of the detection light BD and the reference light BR, a corresponding optical interference effect can be generated. Therefore, the optical path difference between the detection light path and the reference light path may be designed based on an expected optical interference effect.

For example, in order to achieve constructive interference, the detection light path (the distance L1+the distance L2) may be designed to be equal to the reference light path (the distance L1'+the distance L2'). For example, the distance L1 may be equal to the distance L1', and the distance L2 may be equal to the distance L2'. In other words, the detection light path and the reference light path may be substantially symmetrical relative to the light splitting element 300. In addition, in some embodiments, the distance L1, the distance L1', the distance L2, and the distance L2' may be substantially equal, but the present invention is not limited thereto.

Further, in order to achieve constructive interference, the optical path difference between the detection light path (the distance L1+the distance L2) and the reference light path (the distance L1'+the distance L2') may also be designed to be common multiples of each half wavelength of all wavelength light of the incident light B1. Specifically, it is assumed that the incident light B1 has first wavelength light and second wavelength light, a wavelength of the first wavelength light is $\lambda_1$, a wavelength of the second wavelength light is $\lambda_2$, and there is an optical path difference d between the detection light path and the reference light path. In this case, the following equation 1 is satisfied.

$$|(L1+L2)-(L1'+L2')|=d=m\times\tfrac{1}{2}\lambda_1=n\times\tfrac{1}{2}\lambda_2 \qquad \text{Equation 1}$$

m and n are each an independent integer.

Accordingly, the optical path difference (d) may be designed as required to be common multiples (m times, n times) of a half wavelength of the first wavelength light ($\tfrac{1}{2}\lambda_1$) and a half wavelength of the second wavelength light ($\tfrac{1}{2}\lambda_2$), so that no dispersion occurs on the first wavelength light and the second wavelength light in the split detection light BD and reference light BR that converge again, and the expected constructive interference can be generated. However, the above is merely an example, and the present invention is not limited thereto. For example, the optical path difference may also be designed such that destructive interference can be generated according to the present invention or such that the incident light B1 can include more different wavelength light. Accordingly, a person of ordinary skill in the art should be able to understand the principles of the present invention from the above descriptions, so as to make corresponding adjustments and changes.

Figure 2C:
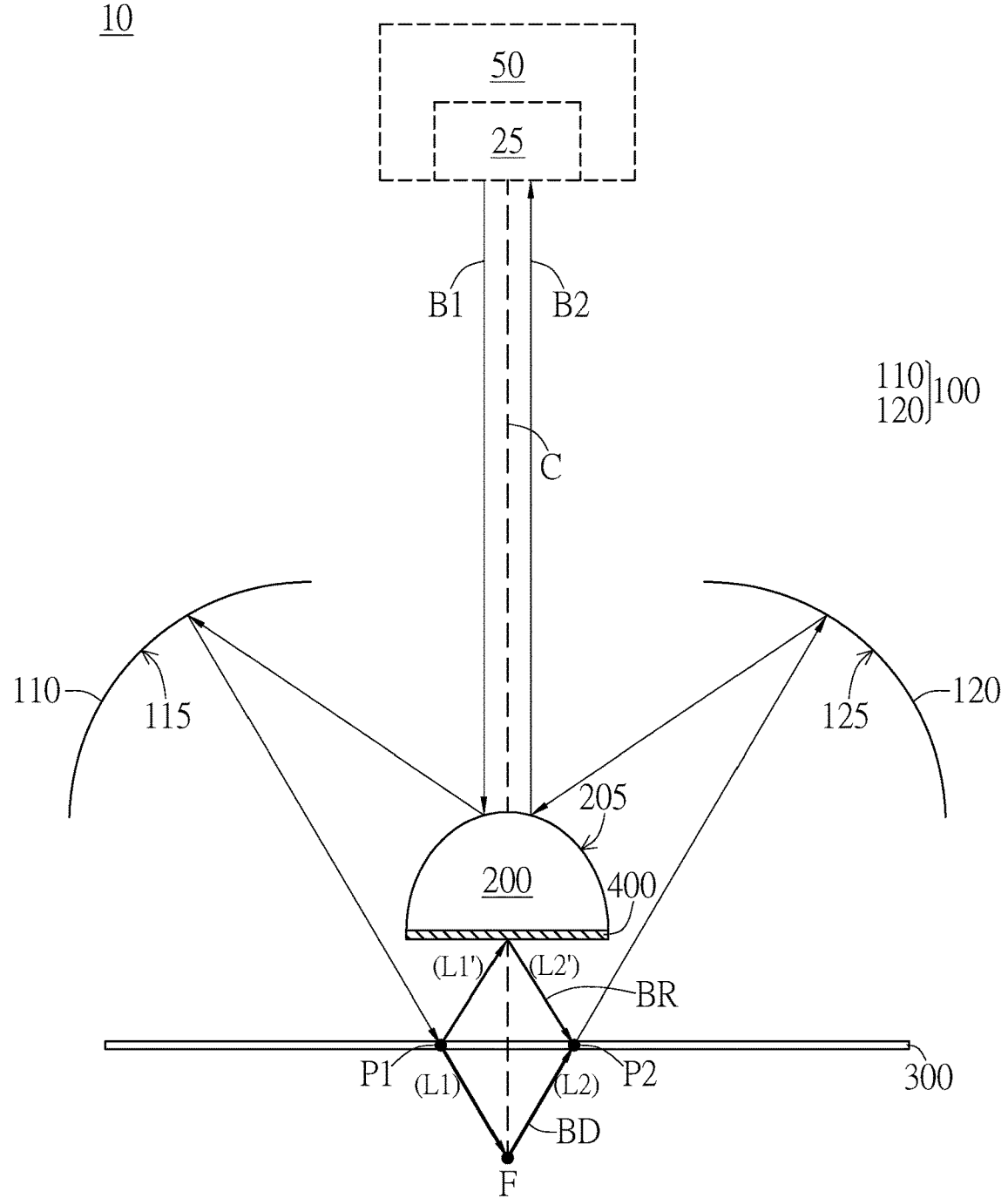

Still referring to FIG. 2C, the converged emergent light B2 that generates corresponding optical interference may be emitted away from the preset focus F, and then sequentially reflected through the second concave surface portion 120 and the convex mirror 200. Accordingly, the emergent light B2 is eventually reflected by the convex mirror 200. The emergent light B2 emitted in a direction opposite to the incident light B1 may be processed or analyzed as required. For example, other optical analysis instruments further disposed in the light processing module 50 may be used for further analyzing the emergent light B2 carrying information about a specific object (such as a to-be-detected sample), so as to analyze a property of the specific object (such as the to-be-detected sample) disposed on the preset focus F. In addition, in order to separate the incident light B1 and the emergent light B2, a circulator may be further disposed at a light entrance/exit of the reflective condensing interferometer 10. In this way, for example, the emergent light B2 can be transferred to the optical analysis instrument or the optical processing instrument more accurately for detection, analysis, or processing. For example, the light processing module 50 may be any component or instrument to be combined with the reflective condensing interferometer 10 and may be configured to process or analyze the incident light B1 and/or the emergent light B2. However, the present invention is not limited to the specific example herein.

Other optical paths for emitting the incident light B1 toward the convex mirror 200 in parallel to the central axis C may be similar to the optical path described in detail above with reference to FIG. 2A to FIG. 2C. For example, in other embodiments, referring to FIG. 2D, the incident light B1 may be otherwise symmetrically focused through a similar optical path relative to the central axis C with respect to FIG. 2A to generate an interference effect. In other words, in this embodiment, the incident light B1 may be reflected by the convex mirror 200 and then reflected by the second concave surface portion 120 (instead of the first concave surface portion 110). After passing through an intermediate focusing and interference path, the incident light is finally reflected by the first concave surface portion 110 (instead of the second concave surface portion 120) and then reflected back by the convex mirror 200.

Figure 2D:
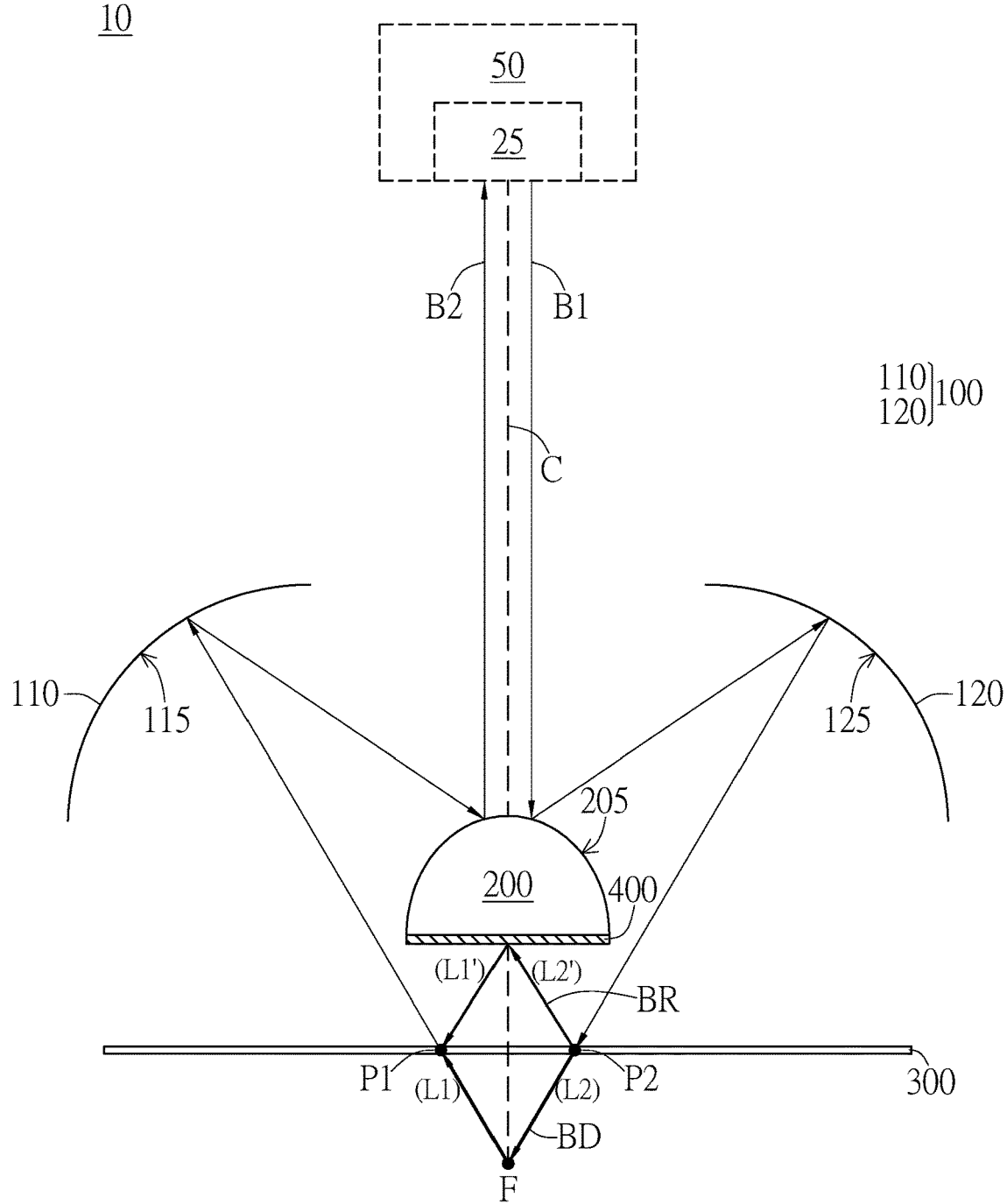
Figure 3:
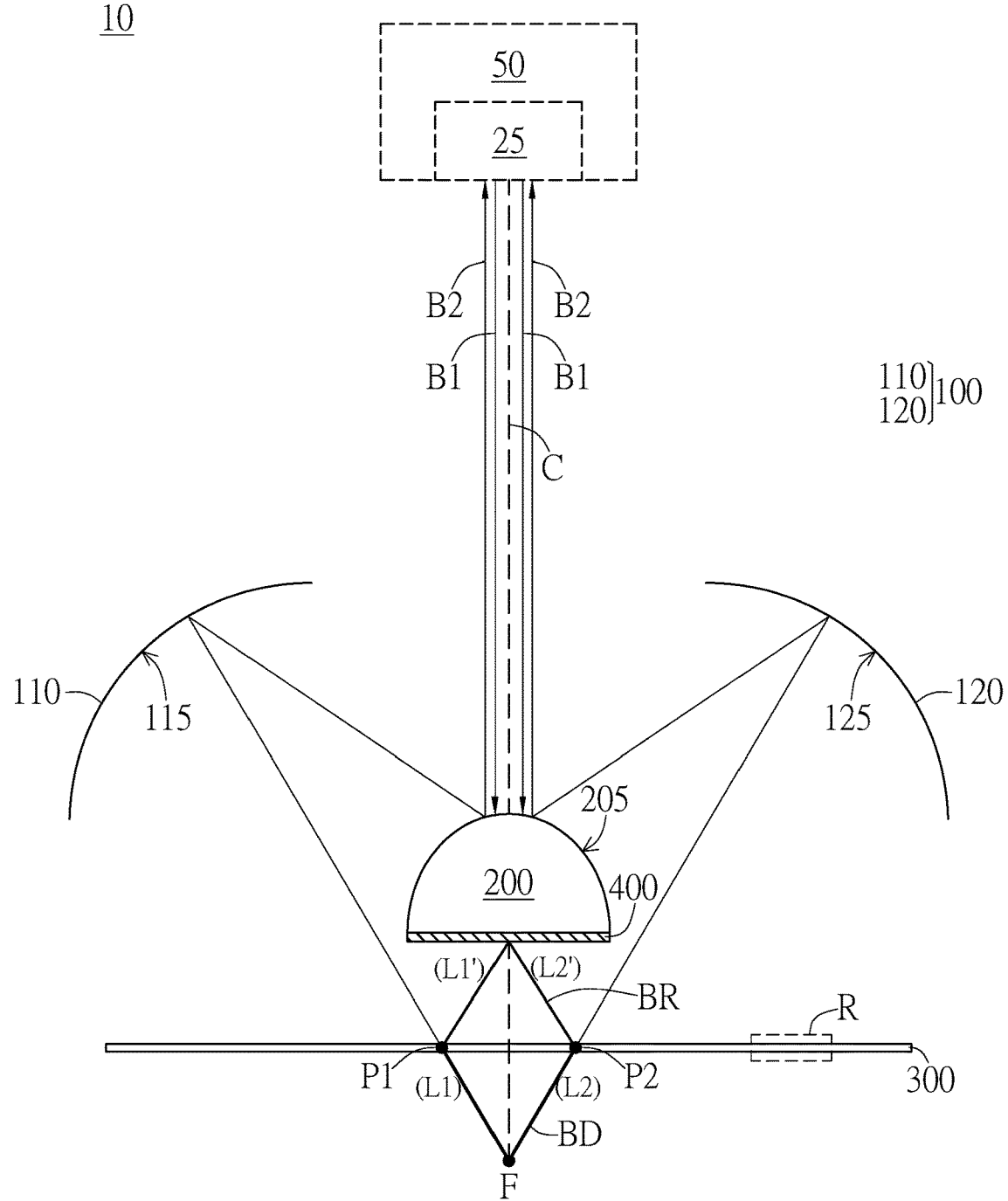

Further, referring to FIG. 3, based on both FIG. 2A and FIG. 2D, a plurality of beams of incident light B1 is incident or integrated incident light B1 with a relatively large cross-sectional area is incident symmetrically in parallel to the central axis C, so that generated emergent light B2 has a stronger signal. Accordingly, a person of ordinary skill in the art should be able to understand the principles of the present invention from the above description, thereby adjusting a required amount or a required cross-sectional area of the incident light B1. The details are not described herein again.

Figure 4:
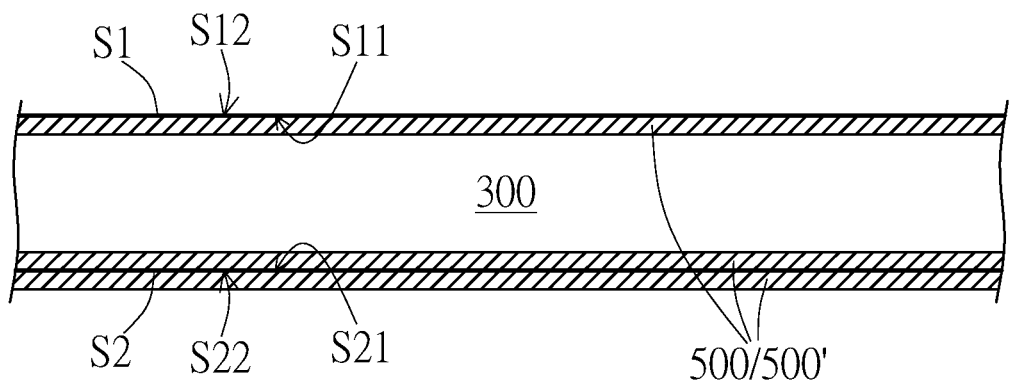
FIG. 4 is an enlarged schematic view of an anti-reflection film or an anti-reflection coating layer covered on a light splitting element of a reflective condensing interferometer according to an embodiment of the present invention.

In addition, FIG. 4 is an enlarged schematic view of a block R of the light splitting element 300 in FIG. 3. According to an embodiment, the light splitting element 300 may have a first side surface S1 facing the convex mirror 200 and a second side surface S2 facing away from the convex mirror 200. An inner surface S11 of the first side surface S1, an inner surface S21 of the second side surface S2, an outer surface S22 of the second side surface S2, or a combination thereof may be further covered with an anti-reflection film 500 or an anti-reflection coating layer 500'. Therefore, meaningless reflection of the light inside the light splitting element 300 or signal loss caused when the detection light BD reflected at the preset focus F cannot be transmitted through the light splitting element 300 can be reduced or avoided. However, the present invention is not limited thereto. According to requirements such as adjustment of a light splitting capability of the light splitting element 300, an outer surface S12 of the first side surface S1 may be further covered with the anti-reflection film 500 or the anti-reflection coating layer 500'.

During application of the reflective condensing interferometer 10 in this embodiment, the reflective condensing interferometer 10 may be disposed in air. However, the reflective condensing interferometer 10 may also be disposed in a medium in addition to air according to any factor such as a required transmittance. For example, the reflective condensing interferometer 10 may be disposed in liquid such as oil. As described above, a person of ordinary skill in the art should be able to easily apply, according to requirements, the reflective condensing interferometer 10 of the present invention to different media for operation, and the embodiments of the present invention are not limited to the specific aspect.

According to this embodiment, the reflective condensing interferometer 10 can implement the functions of focusing and generating an interference signal, and can reduce or avoid generation of dispersion. Further, since the detection light path (the distance L1+the distance L2) can be easily adjusted to be equal to the reference light path (the distance L1'+the distance L2'), desired optical interference can be relatively easily achieved. Therefore, broadband light including many different wavelength lights can be applied to implement the functions of focusing and generating an interference signal while reducing or avoiding generation of dispersion.

Next, a reflective condensing interferometer 20 according to another embodiment of the present invention is further described below with reference to FIG. 5. Differences from the above reflective condensing interferometer 10 are mainly described, and details similar to or the same as those of the above reflective condensing interferometer 10 are omitted or briefly described.

Figure 5:
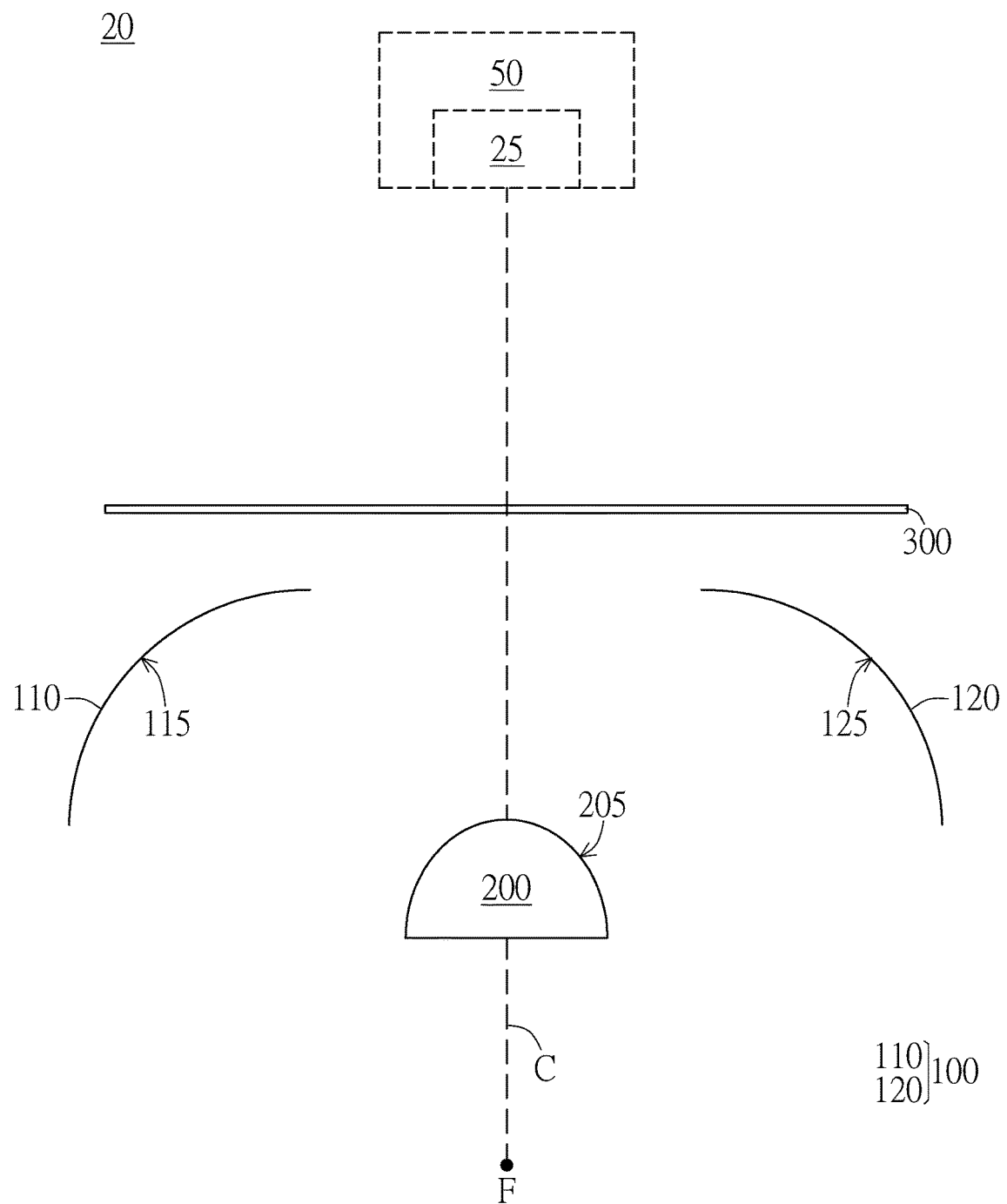
FIG. 5 is a schematic diagram of a reflective condensing interferometer according to another embodiment of the present invention.

Referring to FIG. 5, the reflective condensing interferometer 20 for focusing on the preset focus F according to this embodiment includes: a light source 25 (which is selectively disposed) configured to emit light preset to be incident into the reflective condensing interferometer 20 in parallel to the central axis C; a concave mirror set 100 having at least a first concave surface portion 110 and at least a second concave surface portion 120 which are oppositely located on two sides of the central axis C and are concave on a surface facing the central axis C and the preset focus F; a convex mirror 200 disposed between the concave mirror set 100 and the preset focus F on the central axis C and convex away from the preset focus F; and a light splitting element 300. The light splitting element 300 according to this embodiment vertically intersects with the central axis C on a side of convex mirror 200 facing away from the preset focus F. In other words, the light splitting element 300 according to this embodiment is not disposed between the convex mirror 200 and the preset focus F but is on a side of a convex surface 205 of the convex mirror 200. Therefore, any incident light is to be split before emitting toward the convex mirror 200.

Figure 6A:
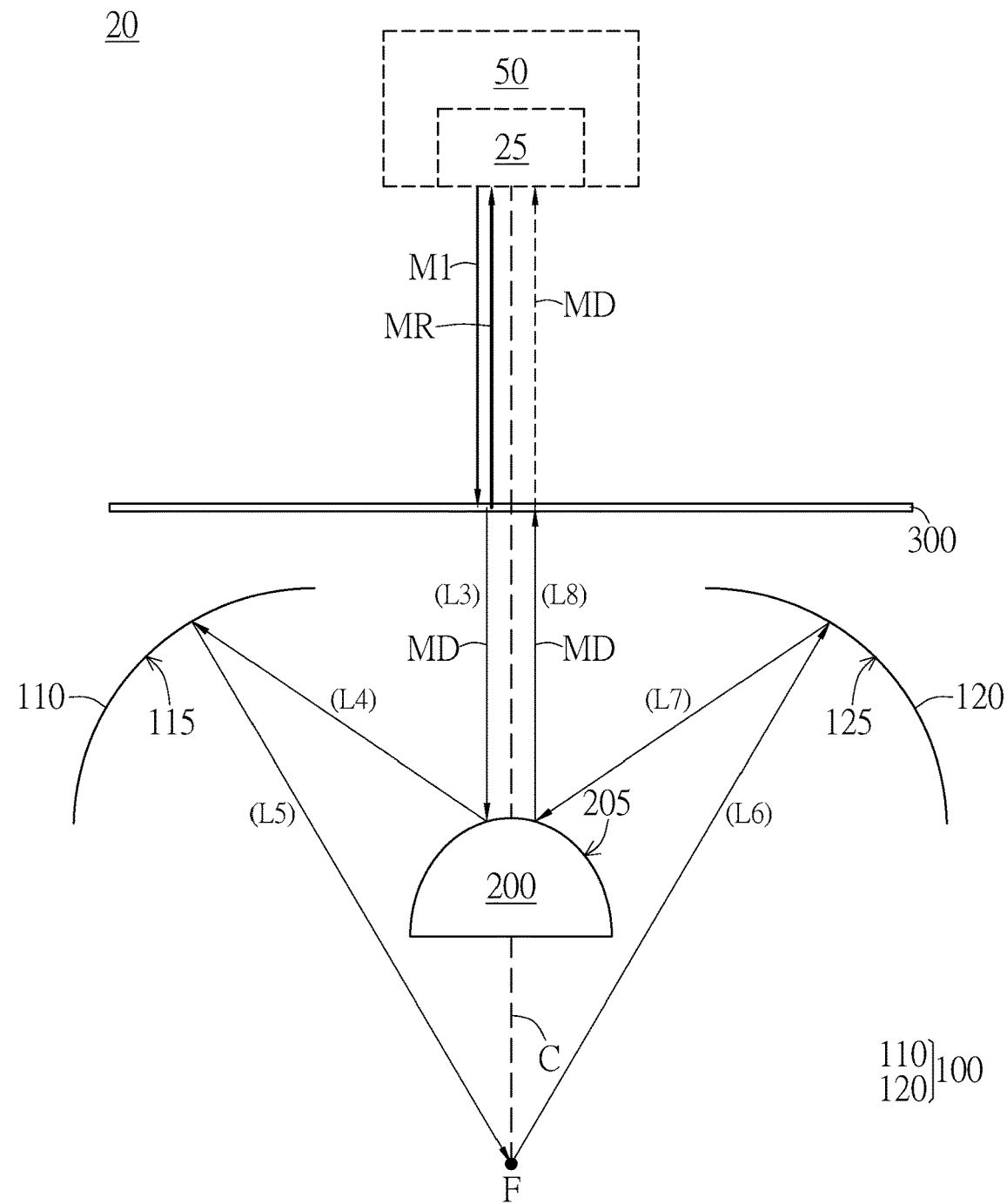
FIG. 6A to FIG. 7 are schematic diagrams of performing focusing and/or interference by a reflective condensing interferometer according to another embodiment of the present invention.

Specifically, referring to FIG. 6A, when the light source 25 emits incident light M1 toward the convex mirror 200 from a side of convex mirror 200 facing the light splitting element 300 in parallel to the central axis C, the incident light M1 is split by the light splitting element 300 into detection light MD for transmission and reference light MR for reflection when passing through the light splitting element 300. Accordingly, the detection light MD may be sequentially reflected by the convex mirror 200 and the first concave surface portion 110 toward the preset focus F. Therefore, the focusing function can be achieved. Next, if a specific object (such as a to-be-detected sample) is disposed on the preset focus F, the detection light MD may be reflected at the preset focus F, and the detection light MD reflected at the preset focus F is then sequentially reflected by the second concave surface portion 120 and the convex mirror 200 and transmitted through the light splitting element 300.

In addition, other optical paths for emitting the incident light M1 toward the convex mirror 200 in parallel to the central axis C may be similar to the optical path described in detail above with reference to FIG. 6A. For example, in other embodiments, referring to FIG. 6B, the incident light M1 may be otherwise symmetrically focused through a similar optical path relative to the central axis C with respect to FIG. 6A. In other words, in this embodiment, the incident light M1 may be reflected by the convex mirror 200 and then reflected by the second concave surface portion 120 (instead of the first concave surface portion 110). After passing through an intermediate focusing path, the incident light is finally reflected by the first concave surface portion 110 (instead of the second concave surface portion 120) and then reflected back by the convex mirror 200.

Figure 6B:
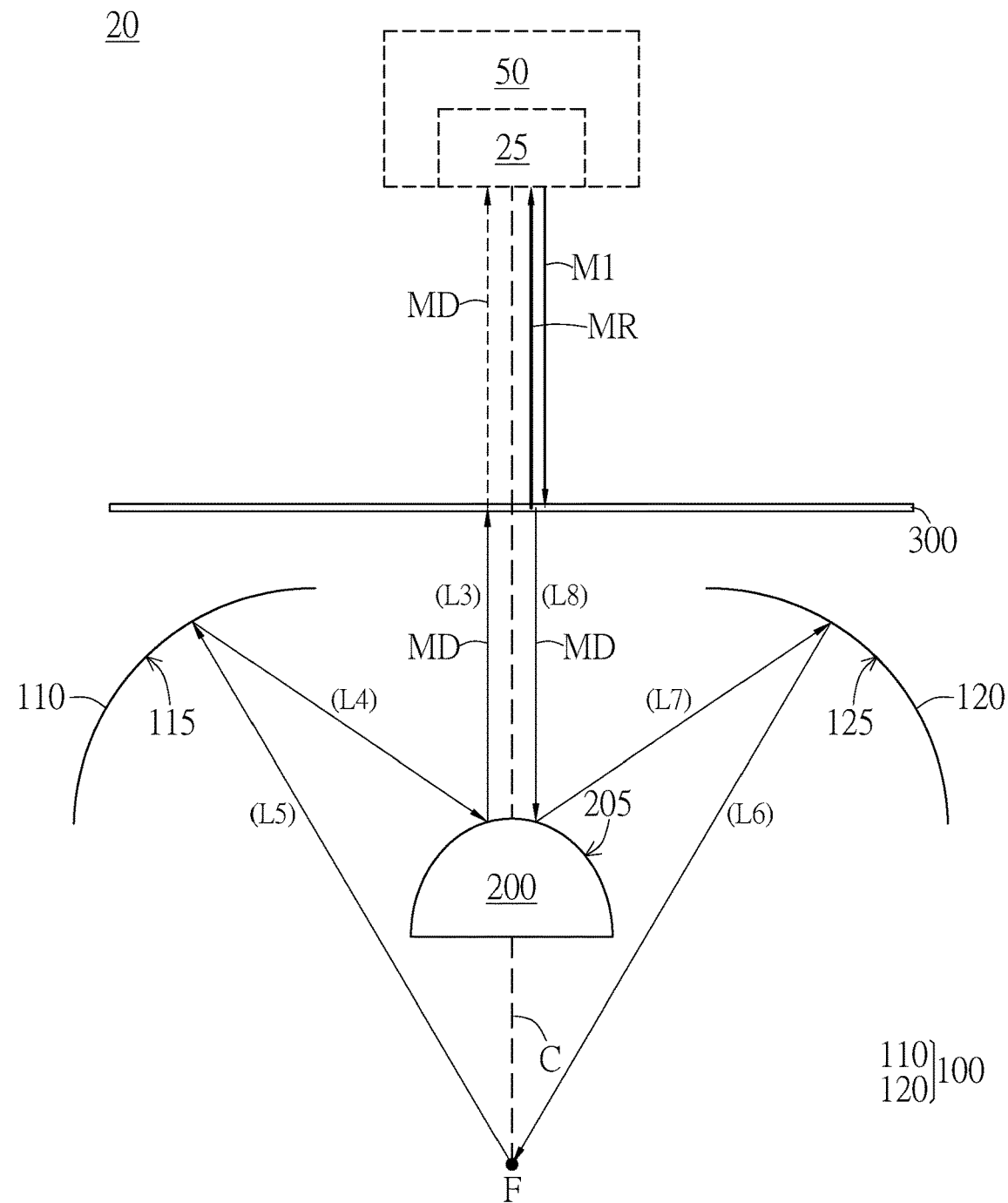
Figure 7:
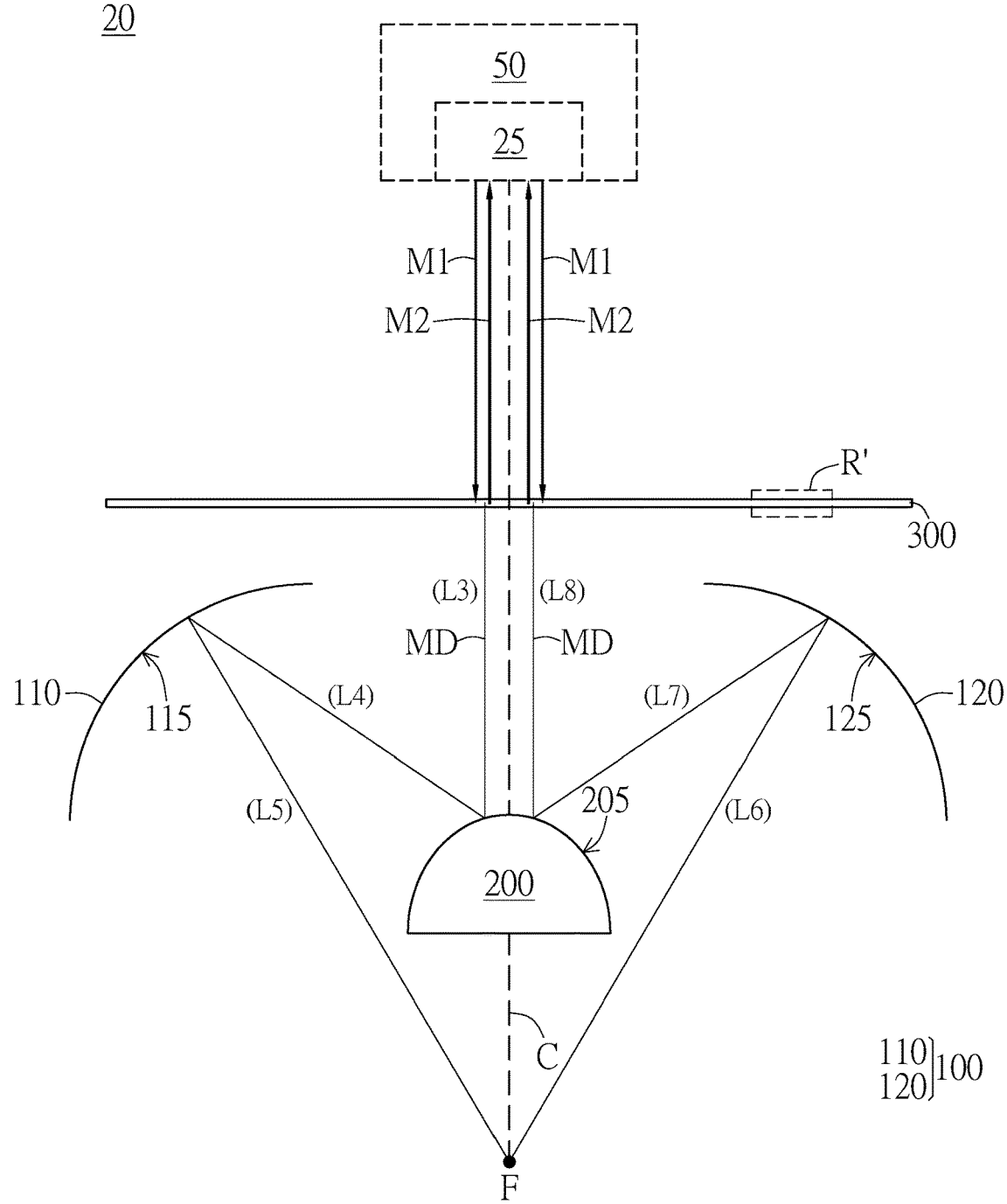

Further, referring to FIG. 7, based on both FIG. 6A and FIG. 6B, a plurality of beams of incident light M1 is incident or integrated incident light M1 with a relatively large cross-sectional area is incident symmetrically in parallel to the central axis C, so that generated emergent light M2 has a stronger signal. Accordingly, a person of ordinary skill in the art should be able to understand the principles of the present invention from the above descriptions, thereby adjusting a required amount or a required cross-sectional area of the incident light M1. The details are not described herein again.

Similar to the above embodiments in FIG. 1 to FIG. 4, the emergent light M2 may be obtained after convergence of the detection light MD and the reference light MR and generates optical interference therein. In this embodiment, a detection light path of the detection light MD from leaving the light splitting element 300 to returning to the light splitting element 300 is a sum of a distance L3, a distance L4, a distance L5, a distance L6, a distance L7, and a distance L8. The sum is an optical path difference between the detection light MD for transmission and the reference light MR for reflection. Therefore, similar to the embodiments described above with reference to FIG. 1 to FIG. 4, the optical path difference may be designed based on an expected optical interference effect to implement the expected optical interference effect.

For example, in order to achieve constructive interference, the detection light path (the distance L3+the distance L4+the distance L5+the distance L6+the distance L7+the distance L8) may be designed to be common multiples of each half wavelength of all wavelength light of the incident light M1. Specifically, it is assumed that the incident light M1 has first wavelength light and second wavelength light, a wavelength of the first wavelength light is $\lambda_1'$, and a wavelength of the second wavelength light is $\lambda_2'$. In this case, the following equation 2 is satisfied.

$$L3+L4+L5+L6+L7+L8=a\times\tfrac{1}{2}\lambda_1'=b\times\tfrac{1}{2}\lambda_2' \qquad \text{Equation 2}$$

a and b are each an independent integer.

Accordingly, the detection light path may be designed as required to be common multiples (a times, b times) of a half wavelength of the first wavelength light ($\tfrac{1}{2}\lambda_1'$) and a half wavelength of the second wavelength light ($\tfrac{1}{2}\lambda_2'$), so as to generate the expected constructive interference. However, the above is merely an example, and the present invention is not limited thereto. For example, the optical path difference may also be designed such that destructive interference can be generated according to the present invention or such that the incident light M1 can include more different wavelength light. Accordingly, a person of ordinary skill in the art should be able to understand the principles of the present invention from the above descriptions, so as to make corresponding adjustments and changes.

Similar to the above embodiments in FIG. 1 to FIG. 4, in this embodiment, in order to achieve a desired optical path, a distance of the light splitting element 300 of the reflective condensing interferometer 20 relative to the convex mirror 200 is adjustable. Alternatively, the reflective condensing interferometer 20 may be disposed in various media such as air or liquid. As mentioned above, this is the same as the concept of the above embodiments in FIG. 1 to FIG. 4, and the details are not repeated herein.

Figure 8:
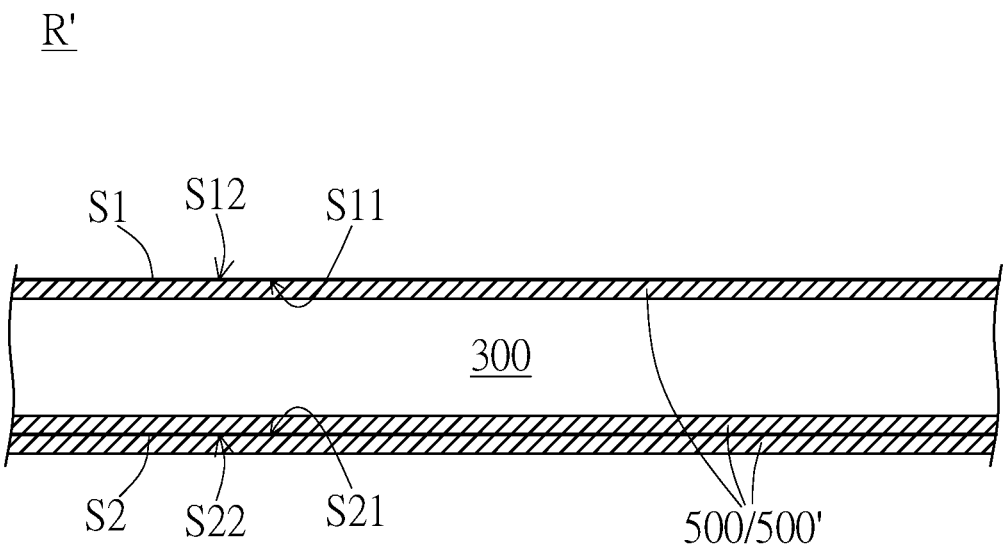
FIG. 8 is an enlarged schematic view of an anti-reflection film or an anti-reflection coating layer covered on a light splitting element of a reflective condensing interferometer according to another embodiment of the present invention.

In addition, FIG. 8 is an enlarged schematic view of a block R' of the light splitting element 300 in FIG. 7. According to an embodiment, the light splitting element 300 may have a first side surface S1 facing away from the convex mirror 200 and a second side surface S2 facing the convex mirror 200. An inner surface S11 of the first side surface S1, an inner surface S21 of the second side surface S2, an outer surface S22 of the second side surface S2, or a combination thereof may be further covered with an anti-reflection film 500 or an anti-reflection coating layer 500'. Therefore, meaningless reflection of the light inside the light splitting element 300 or signal loss caused when the detection light MID reflected by the convex mirror 200 after passing through the focusing optical path cannot be transmitted through the light splitting element 300 can be reduced or avoided. However, the present invention is not limited thereto. According to requirements such as adjustment of a light splitting capability of the light splitting element 300, an outer surface S12 of the first side surface S1 may be also further covered with the anti-reflection film 500 or the anti-reflection coating layer 500'.

According to this embodiment, the reflective condensing interferometer 20 can implement the functions of focusing and generating the interference signal without a reflecting element 400 while reducing or avoiding generation of dispersion.

In summary, the reflective condensing interferometer according to the embodiments of the present invention can reduce or avoid possible dispersion defects while achieving focusing and generating an interference signal. Therefore, the reflective condensing interferometer according to the embodiments of the present invention may be applied to an optical process or an optical system that requires focusing and/or generation of an interference signal. For example, the reflective condensing interferometer may be applied to surface topography measurement, roughness measurement, optical coherent tomography, thin film thickness measurement, etc. However, the present invention is not limited thereto.

The foregoing descriptions are merely some exemplary embodiments of the present invention. It should be noted that various changes and modifications may be made to the present invention without departing from the spirit and principles of the present invention. A person of ordinary skill in the art should understand that the present invention is subject to the appended claims, and various possible changes such as replacements, combinations, modifications, and conversions in accordance with the intention of the present invention shall fall within the scope of the present invention defined by the appended claims.

LIST OF REFERENCE NUMERALS 10, 20: Reflective condensing interferometer
25: Light source
50: Light processing module
100: Concave mirror set
110: First concave surface portion
115: First concave surface
120: Second concave surface portion
125: Second concave surface
200: Convex mirror
205: Convex surface
300: Light splitting element
400: Reflecting element
500: Anti-reflection film
500': Anti-reflection coating layer
C: Central axis
F: Preset focus
B1: Incident light
B2: Emergent light
BD: Detection light
BR: Reference light
P1: First position
P2: Second position
M1: Incident light
M2: Emergent light
MD: Detection light
MR: Reference light
L1, L1', L2, L2': Distance
L3, L4, L5, L6, L7, L8: Distance
R, R': Block
S1: First side surface
S2: Second side surface
S11, S21: Inner surface
S12, S22: Outer surface

What is claimed is:

1. A reflective condensing interferometer for focusing on a preset focus, comprising:
a concave mirror set having at least a first concave surface portion and at least a second concave surface portion which are oppositely located on two sides of a central axis and are concave on a surface facing the central axis and the preset focus, wherein the central axis passes through the preset focus, and light is preset to be incident into the reflective condensing interferometer in parallel to the central axis during use of the reflective condensing interferometer;
a convex mirror disposed between the concave mirror set and the preset focus on the central axis and convex away from the preset focus;
a light splitting element vertically intersecting with the central axis between the convex mirror and the preset focus; and
a reflecting element disposed between the light splitting element and the convex mirror;
wherein the incident light is incident toward the convex mirror, the incident light is sequentially reflected by the convex mirror and the first concave surface portion or the second concave surface portion toward the preset focus, and when passing through the light splitting element, the incident light is split by the light splitting element into detection light to be transmitted toward the preset focus and reference light to be reflected toward the reflecting element;
wherein the detection light and the reference light converge into emergent light to be emitted away after being reflected at the preset focus and the reflecting element respectively; and
wherein the incident light has first wavelength light and second wavelength light, the split detection light and reference light pass through a detection light path and a reference light path respectively before convergence, an optical path difference between the detection light path and the reference light path being equal to common multiples of a half wavelength of the first wavelength light and a half wavelength of the second wavelength light.

2. The reflective condensing interferometer according to claim 1, wherein the convex mirror is symmetrically disposed on the central axis relative to the central axis, and the first concave surface portion and the second concave surface portion are symmetrically disposed on the two sides of the central axis relative to the central axis.

3. The reflective condensing interferometer according to claim 1, wherein a distance of the light splitting element relative to the convex mirror is adjustable.

4. The reflective condensing interferometer according to claim 1, wherein the light splitting element has a first side surface facing the convex mirror and a second side surface facing away from the convex mirror, and an inner surface of the first side surface, an inner surface of the second side surface, an outer surface of the second side surface, or a combination thereof is further covered with an anti-reflection film or anti-reflection coating layer.

5. The reflective condensing interferometer according to claim 1, wherein the reflective condensing interferometer is disposed in a medium other than air.

6. A reflective condensing interferometer for focusing on a preset focus, comprising:
a concave mirror set having at least a first concave surface portion and at least a second concave surface portion which are oppositely located on two sides of a central axis and are concave on a surface facing the central axis;
a convex mirror disposed on the central axis and convex toward the concave mirror set;
a light splitting element vertically intersecting with the central axis on a side of the convex mirror facing away from the concave mirror set; and
a reflecting element disposed between the light splitting element and the convex mirror; wherein
when incident light is incident toward the convex mirror from a side of the convex mirror facing away from the light splitting element in parallel to the central axis, the incident light is sequentially reflected by the convex mirror and the first concave surface portion or the second concave surface portion toward the preset focus, and when passing through the light splitting element, the incident light is split by the light splitting element into detection light to be transmitted toward the preset focus and reference light to be reflected toward the reflecting element; wherein if the detection light and the reference light are split at a first position on the light splitting element, the detection light to be subsequently emitted toward and reflected at the preset focus, and the reference light to be subsequently emitted toward and reflected at the reflecting element converge, at a second position on the light splitting element symmetrical to the first position based on the central axis, into emergent light to be emitted away from the preset focus, and are then sequentially reflected by the second concave surface portion or the first concave surface portion and the convex mirror;

wherein the incident light has first wavelength light and second wavelength light, and the split detection light and reference light pass through a detection light path and a reference light path respectively before convergence, an optical path difference between the detection light path and the reference light path being equal to common multiples of a half wavelength of the first wavelength light and a half wavelength of the second wavelength light.

7. The reflective condensing interferometer according to claim 6, wherein the detection light path is equal to the reference light path.

8. A reflective condensing interferometer for focusing on a preset focus, comprising:

a concave mirror set having at least a first concave surface portion and at least a second concave surface portion which are oppositely located on two sides of a central axis and are concave on a surface facing the central axis and the preset focus, wherein the central axis passes through the preset focus, and light is preset to be incident into the reflective condensing interferometer in parallel to the central axis during use of the reflective condensing interferometer;

a convex mirror disposed between the concave mirror set and the preset focus on the central axis and convex away from the preset focus; and a light splitting element vertically intersecting with the central axis on a side of convex mirror facing away from the preset focus;

wherein when incident light is incident toward the convex mirror from a side of the convex mirror facing the light splitting element in parallel to the central axis, the incident light is split by the light splitting element into detection light for transmission and reference light for reflection when passing through the light splitting element, and the detection light is sequentially reflected by the convex mirror and the first concave surface portion or the second concave surface portion to be emitted toward the preset focus and then reflected at the preset focus;

wherein the incident light has first wavelength light and second wavelength light, and the detection light has a detection light path from leaving the light splitting element to returning to the light splitting element, the detection light path being equal to common multiples of a half wavelength of the first wavelength light and a half wavelength of the second wavelength light.

9. The reflective condensing interferometer according to claim 8, wherein the convex mirror is symmetrically disposed on the central axis relative to the central axis, and the first concave surface portion and the second concave surface portion are symmetrically disposed on the two sides of the central axis relative to the central axis.

10. The reflective condensing interferometer according to claim 8, wherein a distance of the light splitting element relative to the convex mirror is adjustable.

11. The reflective condensing interferometer according to claim 8, wherein the light splitting element has a first side surface facing away from the convex mirror and a second side surface facing the convex mirror, and an inner surface of the first side surface, an inner surface of the second side surface, an outer surface of the second side surface, or a combination thereof is further covered with an anti-reflection film or anti-reflection coating layer.

12. The reflective condensing interferometer according to claim 8, wherein the reflective condensing interferometer is disposed in a medium other than air.

13. The reflective condensing interferometer according to claim 8, wherein the detection light reflected at the preset focus is sequentially reflected by the second concave surface portion or the first concave surface portion and the convex mirror to be transmitted through the light splitting element as emergent light.

* * * * *